Oct. 10, 1961  B. L. STOCK  3,003,631
MEANS FOR DETECTING THE PRESENCE OF CONTENTS IN ENVELOPES
Filed Oct. 8, 1956  3 Sheets-Sheet 1
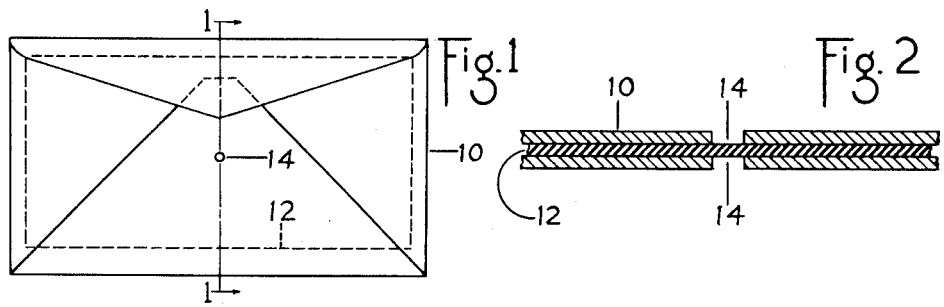
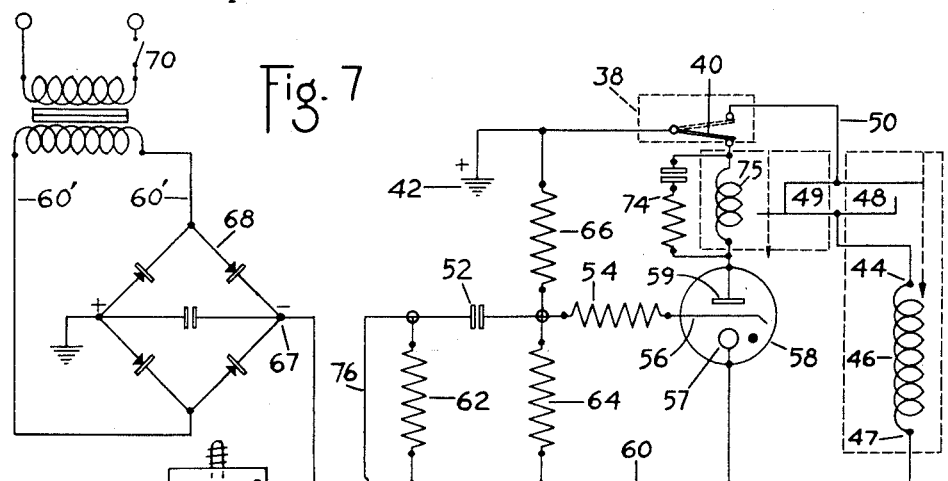
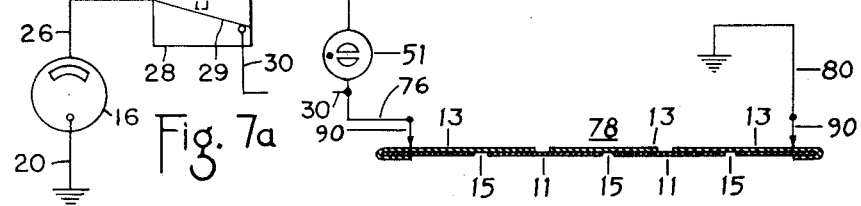
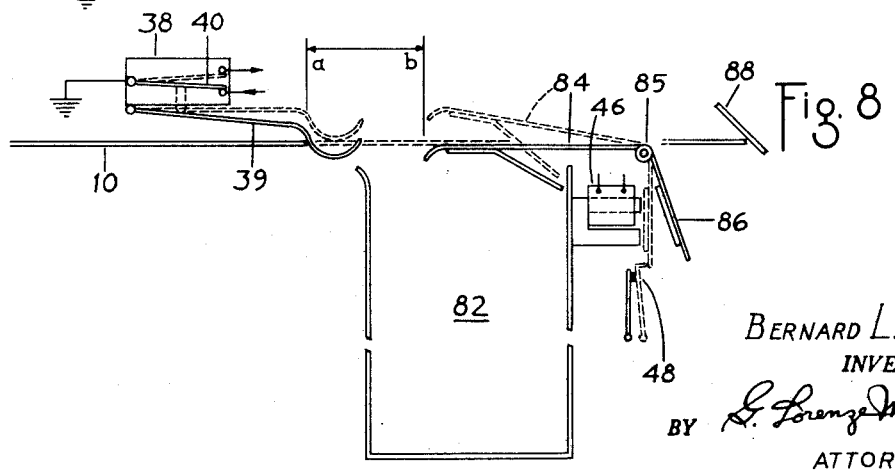
BERNARD L. STOCK
INVENTOR.
BY
ATTORNEY

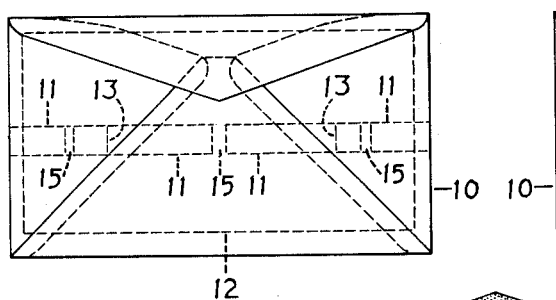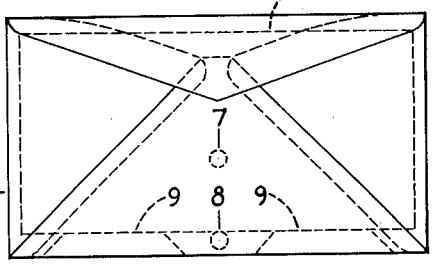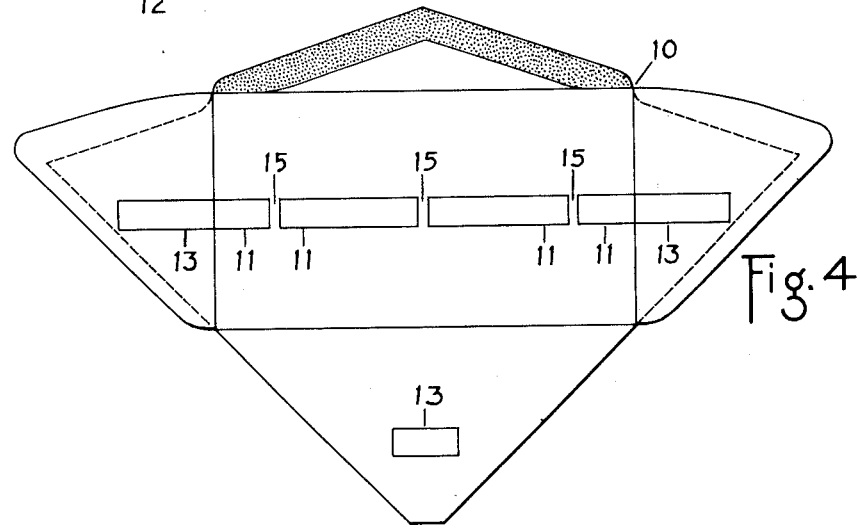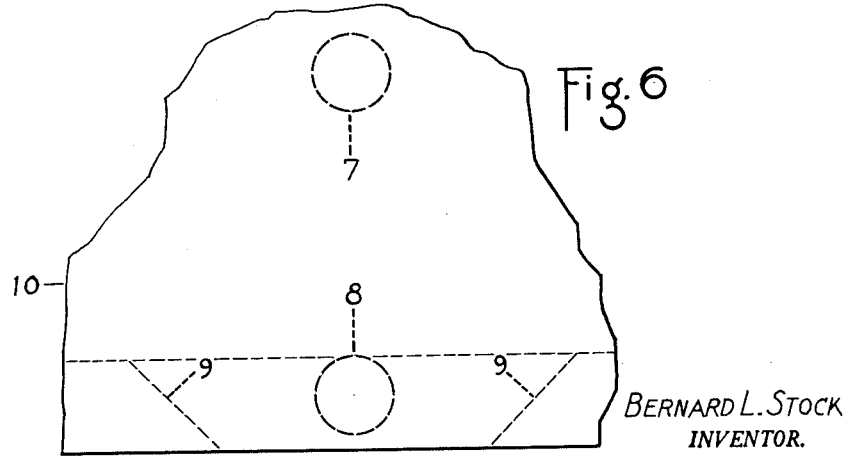

Oct. 10, 1961 B. L. STOCK 3,003,631
MEANS FOR DETECTING THE PRESENCE OF CONTENTS IN ENVELOPES
Filed Oct. 8, 1956 3 Sheets-Sheet 3
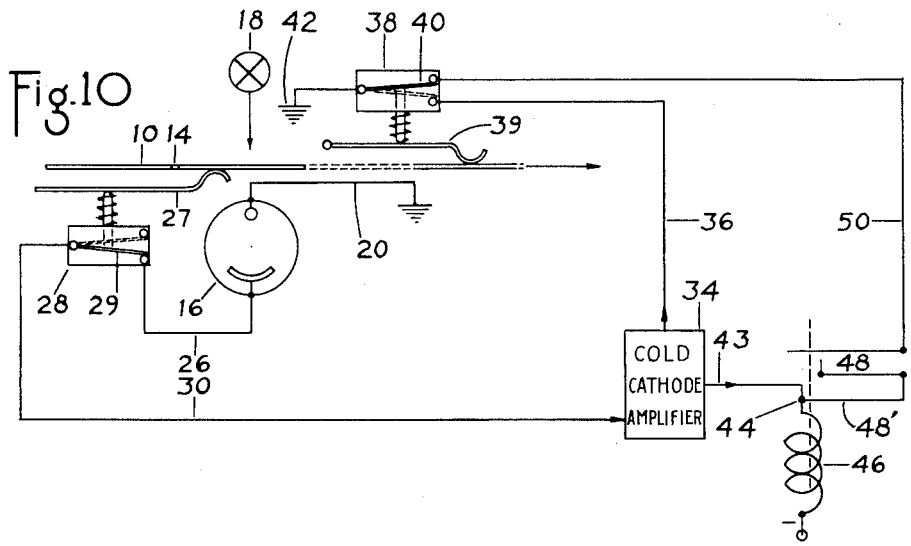
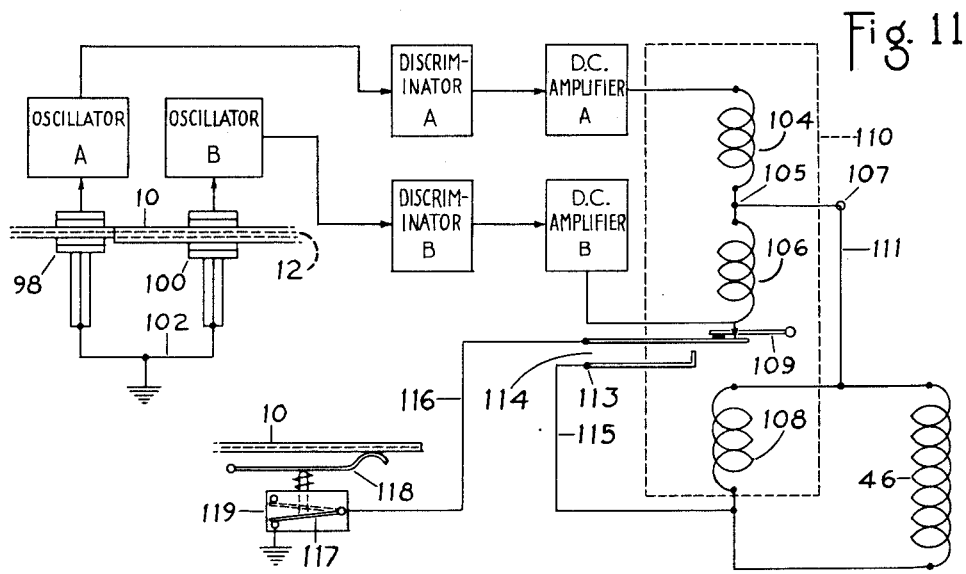
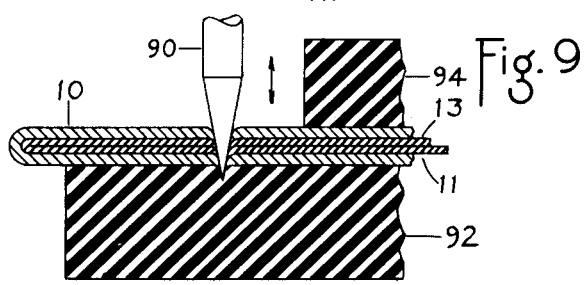
BERNARD L. STOCK
INVENTOR.
BY G. Lorenze Miller
ATTORNEY

United States Patent Office 3,003,631
Patented Oct. 10, 1961

3,003,631
MEANS FOR DETECTING THE PRESENCE OF CONTENTS IN ENVELOPES
Bernard L. Stock, 3317 Normandy Road, Springfield, Ill.
Filed Oct. 8, 1956, Ser. No. 614,499
25 Claims. (Cl. 209—81)

This invention relates to devices for detecting the presence of contents in envelopes and more particularly to those devices using electronic detecting means.

The problem of handling a large number of envelopes containing valuable or important contents, such as checks or money orders, is a problem of long standing.

In the confusion of opening and emptying a plurality of envelopes there is always the chance that all or part of the contents therein will be left in some of the envelopes and inadvertently discarded. Considerable time and money have been lost as a result of accidents of the above described type.

It is, therefore, an object of this invention to provide an envelope checking system which will readily detect the presence of any material left in an envelope and automatically deposit the envelope in separate receptacles under the categories of empty and filled, respectively.

Another object of the invention is to provide an envelope checking system which will detect the presence of any material left in an envelope by electronic detecting means.

Still another object of the invention is to provide an envelope to be used in conjunction with the envelope checking device to facilitate the use of electronic detecting means.

These and other objects of the invention will be made apparent by the following specification and accompanying drawings. It is to be understood that the invention is not limited by the specific embodiments shown and that many changes and modifications can be made without departing from the scope of this invention.

In the drawings:

FIG. 1 is a plan view of an envelope used in one embodiment of the invention.

FIG. 2 is an enlarged cross-section taken along line 1—1 of FIG. 1.

FIG. 3 is a plan view of an envelope used in another embodiment of the invention.

FIG. 4 is a plan view of the envelope of FIG. 3 with all of the flaps open.

FIG. 5 is a plan view of an envelope used in another embodiment of the invention.

FIG. 6 is an enlarged fragmentary view of the envelope of FIG. 5.

FIG. 7 is a wiring diagram of a condition sensing circuit used in several embodiments of the invention.

FIG. 7a is a wiring diagram of a photoelectric sensing circuit employed in conjunction with a portion of the circuit of FIG. 7 in one embodiment of the invention.

FIG. 8 is a side elevation of an envelope assorting apparatus.

FIG. 9 is an enlarged side elevation of a contents detecting device associated with one embodiment of the invention.

FIG. 10 is a partial wiring and block diagram of one embodiment of the invention.

FIG. 11 is a partial wiring and block diagram of another embodiment of the invention.

Referring to the drawings in detail, FIGS. 1 and 2 show a conventional envelope 10 having contents 12 indicated by the continuous dotted line in FIG. 1 and the dark shaded area in FIG. 2. A detector hole 14 is punched through the front and back walls of the envelope 10 in the position shown whereby it will be covered by the contents 12 of the envelope 10 for a purpose to be subsequently described.

Referring to FIG. 10, the envelope 10 is shown in relation to a photoelectric detecting circuit, in which a photocell 16 and a light source 18 act in conjunction with the envelope 10 and detector hole 14 to detect the presence or absence of any contents in the envelope. The remainder of the circuit components constitute an amplifier to actuate the sorting apparatus shown in FIG. 8 and act in response to the detector means.

The anode of the photocell 16 is connected through line 20 to ground. The cathode of the photocell 16 is connected through line 26, spring biased envelope detector switch 28 and line 30 to cold cathode amplifier 34, whereby a circuit is completed between the photocell 16 and the cold cathode amplifier 34.

The cold cathode amplifier 34 which is also connected through line 36 to a second spring biased detector switch 38 and the dotted line position of the detector switch arm 40 to ground 42 produces an output which conditions a circuit controlling the sorting mechanism of the apparatus.

The output of the cold cathode amplifier 34 is fed to a pocket selector relay 41, hereinafter more fully described, to interrupt a circuit extending from ground 42 through envelope detector switch arm 40 when in the full line position, line 50 to its junction with line 43 and thence through line 43 to terminal 44 of a pocket gate magnet coil 46. The terminal 44 of the pocket gate magnet coil 46 is also connected through line 48' to a relay holding switch 48, line 50 and the solid line position of the detector switch arm 40 to ground 42. The circuit of holding switch 48 is also shown in detail in FIG. 7.

Referring to FIGS. 7 and 7a, which when read together and connected by line 30 show the circuit of FIG. 10 in detail, it is seen that the phototube 16 is connected through line 26, switch arm 29, line 30, line 76, glow discharge tube 51, resistor 62 and negative lead 60 to the negative terminal 67 of rectifier 68. The bleeder resistor supply is connected through capacitor 52 and resistor 54 to the starter electrode 56 of a glow discharge triode 58.

Connected between ground 42 and the common negative line 60 are resistors 66 and 64 which at the center tap through resistor 54, provides the necessary bias to the starter electrode 56 of the gas discharge triode 58. Common lead 60 is also connected to bridge rectifier 68 at negative terminal 67. Power is supplied to bridge rectifier 68 through A.C. terminals 60' from the secondary winding at transformer 70.

Connected between the anode 59 of triode 58 and the previously mentioned detector switch 38, shown in FIG. 10, is a parallel combination of a serially connected resistance-capacitance branch 74 and an inductance branch comprising a relay coil 75. The circuit loop involving the detector switch 38, relay switch 48 and the pocket gate magnet coil 46 has already been described with reference to FIG. 10. In addition relay switch 49 of relay 75 is normally closed whereby a parallel circuit path from detector switch 38 to the magnet coil 46 is also established. The negative terminal 47 of the coil 46 is connected to the common lead 60 as is the cathode 57 of triode 58.

For the moment, the section of the circuit indicated below the junction of conductors 30 and 76 is to be disregarded as it represents another embodiment of my invention to be described later.

Referring to the envelope assorting means of FIG. 8, a pocket 82 is shown which is provided to receive envelopes which have material enclosed therein. Envelope 10 is shown in conjunction with the second detector switch 38, switch arm 40 and switch arm actuator 39. Located at a distance $a-b$ from the leading edge of the envelope 10 is a pocket gate 84 which is pivoted at a point 85 and extended therefrom to form an armature 86. The armature 86 acts in conjunction with the previously described pocket gate magnet coil 46 and holding switch 48. The distance $a-b$ is determined by the linear velocity of the envelope 10 and the response time of the pocket gate magnet coil 46 in opening the pocket gate 84. A chute 88 is provided for the reception of empty envelopes.

The operation of the photoelectric contents detecting device is as follows.

Referring to FIGS. 7, 8 and 10, envelope 10 is passed across a first detector switch 28 by suitable conveying means whereby the envelope 10 through means of the switch arm actuator 27 engaged by the envelope and the switch arm 29 closes the circuit between the cathode of the phototube 16 and the cold cathode amplifier tube 58, as previously described.

Assuming first that contents 12 are enclosed in the envelope 10 and that said envelope 10 has caused switch arm 29 to include phototube 16 in the grid circuit of cold cathode amplifier tube 58 by the electrical path comprising resistor 54, capacitor 52, line 76, tube 51, line 30, switch arm 29, line 26, phototube 16, and line 20 to ground, and since contents 12 in envelope 10 will hide light source 18 from phototube 16 by blocking hole 14, it is seen that phototube 16 does not pulse the cold cathode amplifier tube 58. The envelope 10 proceeds to operate the second detector switch 38 and through means of the switch arm actuator 39 engaged by the envelope moves the switch arm 40 to the position at which it contacts line 50. A circuit is now completed from ground terminal 42 which is positive as shown in FIG. 7, to the negative terminal 67 of rectifier bridge 68 by way of line 50, relay switch 49, pocket gate magnet coil 46 and common line 60. The current flowing in the above described circuit energizes pocket gate magnet coil 46 which attracts armature 86, closing the holding switch 48 and rotating the pocket gate 84 clockwise about its pivot point 85 to the dotted line position shown in FIG. 8 whereby the contents containing envelope is directed into pocket 82 by the gate 84.

Assuming now that the envelope 10 is empty and envelope 10 has again caused switch arm 29 to include phototube 16 in the grid circuit of cold cathode amplifier tube 58 as previously described, it is seen that the hole 14 in envelope 10 will permit light to pass from light source 18 to phototube 16, resulting in an increased potential across neon tube 51 thus firing said neon tube and causing current flow through the electrical path comprising the negative terminal 67 of the power supply 68, line 60, resistor 62, line 76, tube 51, switch arm 29, line 26, phototube 16 and line 20 to ground.

It is to be noted that tube 51 is not an essential element of the detecting circuit, but it is a preferred manner of triggering the amplifier tube 58 due to the more positive signal it provides.

Normally, capacitor 52 is charged with its positive end at the junction of resistors 54, 64, and 66. When phototube 16 causes current to flow through 62, in the above-described manner, an "I.R." drop across 62 develops which is greater than the "I.R." drop across 64 and causes the cited junction to be raised in potential and this combined grid voltage causes tube 51 to fire. Conduction of the triode 58 occurs prior to the engagement of envelope 10 with the second detector switch 38. Thus, at the time of conduction, the switch arm 40 is in the solid line position shown in FIG. 7. And thus the current flows from ground 42 through switch arm 40, through the parallel connected branches 74 and 75, through the triode 58, and the common line 60 to the negative terminal 67 of rectifier bridge 68. This current energizes relay coil 75 which opens relay switch 49 to prevent energization of the pocket gate magnet coil 46. Although the empty envelope 10 must pass through the second detector switch 38 prior to passing over the pocket 84 to reach the chute 88, whereby the switch 38 will be opened with respect to the circuit containing the triode 58 and will close the circuit of the pocket gate magnet coil 46, the time constant of the resistance-capacitance branch 74 is correlated with the linear velocity of the envelope 10 so that relay coil 75 will remain energized and hold the relay switch 49 open long enough for the envelope 10 to pass completely across the pocket gate mechanism to the chute 88 without being apprehended. Thus, it is seen from the above description that the envelopes are categorized as to being in a filled or empty state and are rapidly and effectively sorted and deposited in the proper pocket 82 and/or chute 88.

Another embodiment of the invention which is shown in FIGS. 3, 4, 7 and 9 is the circuit continuity method for detecting the presence of enclosed material in envelopes.

Referring to FIGS. 3 and 4, the envelope 10 has conductive strips 11 on the inside surface of the main face of the envelope 10 with conductive strip sections 13 on the inside surface of the flap sections of the envelope. A series of spaced breaks or discontinuities 15 are interposed on the strip sections 11 in such a position that when the envelope 10 is in the folded position shown in FIG. 3, the conductive strip sections 13 on the envelope flaps bridge the discontinuities 15 in the strips 11 and form a single conductive path through the envelope 10, the contents 12 is between the conductive strips 11 and 13 on the main body and flaps of the envelope, respectively. Thus, there is no complete conductive path through envelope 10 when it is in the filled state as the discontinuities 15 in the strips 11 are not bridged by conductive strips 13.

Referring to FIGS. 7 and 9, the detector means for the circuit continuity method is shown as a pair of electrically conductive sensing probes 90 which, as shown in detail in FIG. 9, are vertically reciprocated, by any suitable means, in synchronism with the feeding mechanism so as to pierce the envelope 10 and the superimposed conductive strips 11 and 13 to form terminal points for the conduction of electric current through the conductive strips 11 and 13. The contents detecting device is operated upon a supporting rubber pad 92 which acts in conjunction with a rubber pressure pad 94 reciprocated with the probes 90 to facilitate a firm electrical contact between the conductive strips 11 and 13 if the envelope is in an empty state so that conduction of electric current through the conductive strips will be assured.

Referring to FIG. 7, the conductive strip arrangement is indicated generally by the numeral 78 and is connected into the cold cathode amplifier circuit by one of the probes 90, line 76 and neon tube 51. The remaining probe 90 is connected through line 80 to ground.

In operation, the envelope 10 is conveyed to the contents detecting means where it passes over the supporting rubber block 92 and is pressed firmly thereon by pressure block 94 momentarily as sensing probes 90 pierce the envelope 10 and the conducting strips 11 and 13.

Assuming first that the envelope 10 is empty, a circuit is completed from ground through line 80, conductive strip section 78 and line 76 to the neon tube 51. This causes the neon tube 51 to fire and the cold cathode amplifier circuit to act in the identical fashion as described in conjunction with the photoelectric contents detecting embodiment to allow the empty envelope 10 to pass over the pocket gate mechanism 84 and into the empty envelope receiving chute 88.

If the envelope contains enclosed material 12, the material 12 breaks the conductive strip circuit by preventing the conductive strips 13 from bridging the discontinuities 15 in the strips 11. Thus, when the envelope contains enclosed material, the pocket gate magnet coil 46 is energized and the pocket gate 84 is opened to direct the envelope 10 into the envelope receiving pocket 82 in the same manner as described in conjunction with the photoelectric contents detecting means.

Another embodiment of the invention is shown in FIGS. 5, 6 and 11. This method of contents detection deals with a capacitance sensing method which is also an accurate and reliable way of checking envelopes for the presence of enclosed material therein.

Referring to FIG. 5, an envelope 10 is shown which may contain enclosed material 12. Two detector areas comprising separate cross sectional regions indicated by means of broken line circles 7 and 8, FIG. 6, are provided in a line perpendicular to the lower edge of the envelope 10. Detector area 8 is located between two cemented sections 9 joining the front and rear faces at the bottom of envelope 10 so that the enclosed material 12 may never lie within the area 8. Thus, the detector area 8 is always void of content material and is used as a reference. The detector area 7 is located centrally of the envelope 10 so that if any enclosed material 12 is present it will be disposed across area 7.

The circuit diagram for the capacitance sensing method is shown in FIG. 11. A pair of identical sensing capacitors 98 and 100 are provided to correspond with detector areas 8 and 7, respectively, on the envelope 10. The lower plates of the sensing capacitors 98 and 100 are connected to ground by a common line 102. The upper plate of each capacitor is connected into the tank circuit of an oscilaltor to the particular capacitor. The upper plate of capacitor 98 is in the tank circuit of oscillator A which is coupled to a discriminator A, which in turn is coupled to a D.C. amplifier A, the output of which is connected to a relay coil 104. The upper plate of capacitor 100 is in the tank circuit of oscillator B which is coupled to a discriminator B, which in turn is coupled to a D.C. amplifier B, the output of which is connected to a relay coil 106. Relay 110 has three coils, of which coils 104 and 106 are differentially wound, i.e., the coils are opposing one another when energized with an equal amount of current. Coil 108 is a holding coil which is wound to keep relay 110 energized once coil 108 receives current, immaterial of what condition of coils 104 and 106 may be. Relay 110 also actuates switch 114, which when closed supplies current to its holding coil and pocket magnet 46 through switch 117, when operated by envelope 10. Holding coil 108 and previously described pocket gate magnet coil 46 are connected in parallel and joined to terminal 107 of the power supply, not shown, by line 111. The holding coil-pocket gate magnet coil combination 108—46 is connected to switch terminal 113 of the differential relay actuated switch 114 through the line 115. The relay armature 109 operates the movable contact of the switch 114 which is connected to an envelope detecting switch 119 and through line 116 and a switch arm 117 to ground. Switch arm actuator 118 is sensitive to the presence of an envelope 10.

In operation, the envelope 10 is passed between the sensing capacitors 98 and 100 by suitable conveying means not shown.

Assuming first that the envelope 10 is empty, the areas 7 and 8 are of identical thickness and the sensing capacitors 98 and 100 have identical effects in the tank circuits of their respective oscillators A and B. The oscillators A and B therefore generate identical frequency signals which feed into the discriminators A and B, respectively. The discriminators A and B produce a voltage output of a magnitude determined by the frequency of oscillators A and B, respectively, which is fed into the corresponding D.C. amplifiers A and B. The amplifier A tends to energize relay coil 104 and the amplifier B tends to energize relay coil 106. Since the sensing areas 7 and 8 are of identical thickness, the output of the oscillator-discriminator-amplifier circuits A and B are identical and the output voltages therefrom are equal. Thus the current flowing through coils 104 and 106 has no effect on the relay, and the armature 109 remains stationary, leaving the switch 114 open. This allows envelope 10 to pass over the envelope sensing switch 117 without closing the circuit to the pocket gate magnet coil 46 through switch 114, allowing the envelope to pass over the pocket gate 84 and into the empty envelope chute 88, as shown in FIG. 8.

If the envelope contains enclosed material 12, the thickness of the envelope under the sensing area 7 is greater than that under the sensing area 8 which changes the capacitance of the sensing capacitor 100 and produces a voltage output to relay coil 106 of a different magniture than that voltage applied to relay coil 104. This difference in voltage causes an unbalance between the relay coils 104 and 106 in such a manner that the relay armature 109 is actuated to close switch 114. As a result of closing switch 114 a circuit is completed from terminal 107, through line 111, holding coil-pocket gate magnet coil loop 108—46, line 115 and switch 119 to ground. Thus, the relay holding coil 108 retains switch 114 in a closed position and the pocket gate magnet coil 46 is energized to open pocket gate 84 which directs the envelope 10 into the pocket 82, as described in conjunction with FIG. 8.

It is seen from the above description that the invention provides an accurate and reliable means for detecting the presence of material enclosed in an envelope by sensing means responsive to the difference in thickness of envelope 10 when in a filled or empty state.

As soon as switch 119 is opened, pocket magnet 46 and holding coil 108 de-energize and return to their normal inoperative position for subsequent operation. It may be mentioned that simultaneous opening and closing of sensing capacitors 98 and 100 does not cause relay 110 to energize, since the frequency of both oscillators A and B is also changed in unison. Although the voltage amplitude through coils 104 and 106 is raised or lowered, the balance of the opposing coils is not changed, and the relay remains de-energized.

What I claim and desire to secure by U.S. Letters Patent is:

1. An apparatus for sorting envelopes in accordance with the presence or absence of material enclosed therein, each said envelope being formed to transfer light therethrough only when said material is absent, comprising photoelectric detector means responsive to the transfer of light through said envelope when said material is absent for producing an output signal indicative of such absence, selector means actuated in response to said output signal of said detector means for conditioning a control circuit, and an envelope gate means selectively controlled through the circuit conditioned by said selector means for segregating said envelopes according to the presence or absence condition initially determined by said detector means.

2. An apparatus for sorting envelopes in accordance with the presence or absence of material enclosed in an enevlope comprising, a detector circuit including a pair of laterally spaced electrically conductive sensing electrodes reciprocally operable for penetrating an envelope when disposed in the reciprocable path of said electrodes, said envelope having a discontinuous electrically conductive strip on its interior face and on the interior surface of it flaps, each strip being in a position to bridge the discontinuities of other strip to complete a detector circuit between said electrodes when the envelope is empty, selector means actuated in discriminatory response to completion of said detector circuit for conditioning a control circuit, and an enevlope gate means selectively controlled through the circuit conditioned by said selector means for segregating said envelopes according to the proper empty or non-empty category initially determined by said detector circuit.

3. An apparatus as set forth in claim 1, including an electric power source having its positive terminal connected to ground, a common negative line extending from the negative terminal of said power source to the negative terminal of a pocket gate magnet coil, a cold cathode amplifier connected to said common line with the triggering electrode thereof connected between ground and said common line through a resistance network for imparting a prefiring biasing potential to the triggering electrode, a relay coil in the plate circuit of said amplifier connected in parallel with a series connected resistance and capacitance branch, an envelope detector switch alternately connectable between ground and said plate circuit or ground and the circuit containing said pocket gate magnet coil, a combination relay switch and holding switch between said envelope detector switch and the positive terminal of said pocket gate magnet coil and a glow discharge tube coupled to the triggering electrode circuit by a capacitor to produce the output signal of said detector means and pulse said signal to said triggering electrode.

4. An appartus as set forth in claim 1, including, a pocket for receiving filled envelopes, a gate for said pocket, a pocket gate magnet selectively energized by a pocket gate magnet coil to open said pocket gate, and a discharge chute for receiving empty envelopes located adjacent the far end of said pocket with respect to the direction of travel of said envelope.

5. An apparatus for sorting enevelopes according to the presence or absence of material enclosed in an envelope, said envelopes having electrical conductors complementally disposed on opposite interior surfaces thereof so as to jointly constitute a single continuous conducting path only when said envelope is empty comprising detector means including electrodes each engageable with a respective one of said conductors and responsive to the conductibility of electric current through said conductors when said envelope is empty of contents to produce a signal characteristic of such state of said envelope, and sorting means selectively controlled by said detector means depending upon the production or non-production of said signal for segregating said envelopes into separate receiving means for said envelopes according to whether initially determined by said detector means as being either in the filled state or the empty state category.

6. An apparatus for sorting envelopes according to the presence or absence of material enclosed in an envelope, each envelope being formed with a pair of complementary electrically conductive discontinuous strips each on opposite interior surfaces thereof to constitute a continuous conductor when the envelope is empty, comprising detector means responsive to the conductibility of electric current through said continuous conductor when said envelope is in an empty state to produce a signal characteristic of said state of said envelope, said detector means including a pair of electrically conductive sensing electrodes for contacting opposite extremities of said continuous conductor of an envelope when disposed intermediate said electrodes, selector means actuated in discriminatory response to said signal of said detector means for conditioning a control circuit, and an envelope assorting means selectively controlled through the circuit conditioned by said selector means for segregating said envelopes according to the proper empty or non-empty category initially determined by said detector means.

7. An apparatus as set forth in claim 6, including an electric power source having its positive terminal connected to ground, a common negative line extending from the negative terminal of said power source to the negative terminal of a pocket gate magnet coil, a cold cathode amplifier connected to said common line with the triggering electrode thereof connected between ground and said common line through a resistance network for imparting a prefiring biasing potential to the triggering electrode, a relay coil in the plate circuit of said amplifier connected in parallel with a series connected resistance and capacitance branch, an envelope sensing switch alternately connectable between ground and said plate circuit or ground and the circuit containing said pocket gate magnet coil, a relay switch actuated by said relay coil for breaking the circuit between said sensing switch and said magnet coil, a holding switch between said envelope sensing switch and the positive terminal of said pocket gate magnet coil actuated by said magnet coil for maintaining said coil energized, and a glow discharge tube coupled to the triggering electrode circuit by a capacitor to produce the output signal of said detector means and pulse said signal to said triggering electrode.

8. An apparatus as set forth in claim 5, wherein said envelope sorting and receiving means comprise a pocket for receiving filled envelopes, a gate for said pocket, a pocket gate magnet selectively energized by a pocket gate magnet coil to open said pocket gate, and a discharge chute for receiving empty envelopes located adjacent the far end of said pocket with respect to the direction of travel of said envelopes.

9. An apparatus for sorting envelopes in accordance with the presence or absence of material enclosed in an envelope comprising detector means responsive to the dielectric values of said envelope and material, depending on whether said envelope is in a filled or empty state, to produce a frequency response characteristic of said state of said envelope, selector means actuated in discriminatory response to said frequency response of said detector means for conditioning a control circuit, and an envelope assorting means selectively actuated through the circuit conditioned by said selector means for placing said envelope in the proper empty or filled category initially determined by said detector means.

10. An apparatus for sorting envelopes in accordance with the presence or absence of material enclosed in an envelope, said envelopes having a contents detecting area and a reference area unaffected by said contents in said envelope, comprising detector means responsive to the different dielectric values of said envelope and material, depending on whether said envelope is in a filled or empty state, wherein said detector means comprise a pair of identical sensing capacitors having gap distances adjustably spaced by an envelope positioned between the plates of said capacitors with said reference area between the plates of one of said capacitors and said contents detecting area between the plates of the other of said capacitors, individual oscillators for each of said capacitors containing said capacitors in the tank circuits thereof to produce a frequency response characteristic of said state of said envelope as determined by the dielectric value of said envelope through said reference and contents detecting areas, respectively, selector means actuated in discriminatory response to said frequency response of said detector means for conditioning a control circuit, and an envelope assorting means selectively actuated through the circuit conditioned by said selector means for sorting said envelopes according to the proper empty or filled category initially determined by said detector means.

11. An envelope for use in an apparatus of the type described, comprising a pair of discontinuous electrically conductive strips each disposed on the opposite inner surfaces of the envelope faces, the conducting portion of each strip being in position to bridge the discontinuities in the other strip upon contact between said strips when said enevlope is empty, whereby the closing of an electric circuit external to said envelope is achieved when the extremities of said strips are engaged by electrically conductive sensing electrodes in said external circuit.

12. An apparatus for detecting the presence or absence of material enclosed in an envelope means, said envelope means being formed to transfer a predetermined amount of energy therethrough only when in an empty state comprising, detector means responsive to the transfer of energy through said envelope means when in an empty state for producing an output signal indicative of such a state, and selector means actuated in response to said output of said detector means for manifesting the empty or filled category to which said enevolpe means belongs as determined by said detector means.

13. An apparatus for detecting the presence or absence of material enclosed in an envelope, said envelope being formed with complementary electrically conductive discontinuous strips each on opposite interior surfaces thereof to constitute a continuous conductor when the envelope is empty comprising, detector means responsive to the conductibility of electric current thru said continuous conductor when said envelope is in an empty state to produce a signal characteristic of said state, said detector means including a pair of electrically conductive sensing electrodes for contacting opposite extremities of said continuous conductor when disposed intermediate said electrodes, and selector means actuated in response to said signal from said detector means to manifest the empty or filled category to which said envelope belongs as determined by said detector means.

14. An apparatus for sorting envelope means in accordance with the presence or absence of material enclosed therein, each said envelope means being formed to effect transfer of a predetermined amount of energy therethrough only when said material is absent, comprising detector means responsive to the transfer of energy through said envelope means when said material is absent for producing an output signal indicative of such absence, selector means actuated in response to said output signal of said detector means for conditioning a control circuit, and an envelope gate means selectively controlled through the circuit conditioned by said selector means for segregating said envelope means according to the presence or absence condition initially determined by said detector means.

15. An apparatus for sorting envelopes in accordance with the presence or absence of material enclosed therein, each said envelope being formed to transfer light therethrough only when said material is absent, comprising photoelectric detector means responsive to the transfer of light through said envolpe when said material is absent for producing an output signal indicative of such absence, said detector means comprising a light source, a phototube disposed to receive light from said source passing through an envelope, and an envelope actuated detector switch for connecting said phototube to a current source, amplifying means for augmenting the output signal of said phototube, selector means actuated in discriminatory response to said output signal of said phototube as augmented by said amplifier means for conditioning a control circuit, and an envelope gate means selectively actuated through the circuit conditioned by said selector means for segregating said envelopes according to the presence or absence condition initially determined by said detector means.

16. An apparatus for sorting envelopes in accordance with the presence or absence of material enclosed therein, each envelope having means to effect transfer for a predetermined amount of energy therethrough only when said material is absent, comprising the combination of said envelope and means, detector means responsive to the transfer of energy through said first mentioned means when said material is absent for producing an output signal indicative of such absence, selector means actuated in response to said output signal of said detector means for conditioning a control circuit, and an envelope gate means selectively controlled through the circuit conditioned by the selector means for segregating said envelopes according to the presence or absence condition initially determined by said detector means.

17. An apparatus for sorting envelopes in accordance with the presence or absence of material enclosed therein, each envelope having means to effect transfer of a predetermined amount of light therethrough only when said material is absent, comprising the combination of said envelope and means, photoelectric detector means responsive to the transfer of light through said first mentioned means when said material is absent for producing an output signal indicative of such absence, selector means actuated in response to said output signal of said detector means for conditioning a control circuit, and an envelope gate means selectively controlled through the circuit conditioned by said selector means for segregating said envelopes according to the presence or absence condition initially determined by said detector means.

18. An apparatus for sorting envelopes in accordance with the presence or absence of material enclosed in an envelope comprising, the combination of said envelope, a detector circuit including a pair of laterally spaced electrically conductive sensing electrodes reciprocably operable for penetrating an envelope when disposed in the reciprocable path of said electrodes, each said envelope having a discontinuous electrically conductive strip on its interior face and on the interior surface of its flaps, each strip being in a position to bridge the discontinuities of the other strip to complete the detector circuit between said electrodes when said material is absent, selector means actuated in discriminatory response to completion of said detector circuit for conditioning a control circuit, and an envelope gate means selectively controlled through the circuit conditioned by said selector means for segregating said envelopes according to the presence or absence condition initially determined by said detector circuit.

19. An apparatus for sorting envelopes in accordance with the presence or absence of material enclosed in an envelope, each said envelope having means to effect transfer of a predetermined amount of light therethrough only when said material is absent, comprising the combination of said envelope, photoelectric detector means responsive to the transfer of light through said envelope when said material is absent for producing an output signal indicative of such absence, said detector means comprising a light source, a phototube disposed to receive light from said source passing through the envelope, and an envelope actuated detector switch for connecting said phototube to a current source, amplifier means for augmenting the output of said phototube, selector means actuated in discriminatory response to said output signal of said phototube as augmented by said amplifier means for conditioning a control circuit, and an envelope gate means selectively actuated through the circuit conditioned by said selector means for segregating said envelopes according to the presence or absence condition initially determined by said detector means.

20. An apparatus for sorting envelopes in accordance with the presence or absence of material enclosed in an envelope, each said envelope having electrical conductors complementally disposed on opposite interior surfaces thereof so as to jointly constitute a single continuous conducting path only when said material is absent, comprising the combination of said envelope, detector means including electrodes each engageable with a respective one of said conductors and responsive to the conductibility of electric current through said conductors when said material is absent for producing an output signal indicative of such absence, and sorting means selectively controlled by said detector means depending upon the production or non-production of said signal for segregating said envelopes into separate receiving means for said envelopes according to the initial determination by said detector means of the presence or absence condition of an envelope.

21. An apparatus for sorting envelopes in accordance with the presence or absence of material enclosed in an envelope, each said envelope having a pair of complementary electrically conductive discontinuous strips each on opposite interior surfaces thereof to constitute a continuous conductor when said material is absent, comprising the combination of said envelope, detector means responsive to the conductibility of electric current through said continuous conductor when said material is absent for producing an output signal indicative of such absence, said detector means including a pair of electrically conductive sensing electrodes for contacting opposite extremities of said continuous conductor of an envelope when disposed intermediate said electrodes, selector means actuated in discriminatory response to said signal of said detector means for conditioning a control circuit, and an envelope assorting means selectively controlled through the circuit conditioned by said selector means for segregating said envelopes according to the presence or absence condition initially determined by said detector means.

22. An apparatus for sorting envelopes in accordance with the presence or absence of material enclosed in an envelope comprising, the combination of said envelope, detector means responsive to the dielectric values of said envelope and material, depending on whether said material is present or absent, for producing a frequency response indicative of the presence or absence condition of said envelope, selector means actuated in discriminatory response to said frequency response of said detector means for conditioning a control circuit, and an envelope sorting means selectively actuated through the circuit conditioned by said selector means for segregating said envelopes according to the presence or absence condition initially determined by said detector means.

23. An apparatus for sorting envelopes in accordance with the presence or absence of material enclosed in an envelope, each said envelope having a content material detecting area and a reference area said reference area being uneffected by content material within said envelope, comprising the combination of said envelope, detector means responsive to the different dielectric values of said envelope and material, depending upon the presence or absence of said material, said detector means comprising a pair of identical sensing capacitors having gap distances adjustably spaced by an envelope positioned between the plates of said capacitors with said reference area between the plates of one of the capacitors and said content material detecting area between the plates of the other of said capacitors, and individual oscillators for each of said capacitors containing said capacitors in the tank circuits thereof, for producing a frequency response indicative of the presence or absence of material condition of said envelope as determined by the dielectric values of said reference and content material detecting areas, respectively, selector means actuated in discriminatory response to said frequency response of said detector means for conditioning a control circuit, and an envelope sorting means selectively actuated through the circuit conditioned by said selector means for segregating said envelopes according to the presence or absence condition initially determined by said detector means.

24. An apparatus for detecting the presence or absence of material enclosed in an envelope, each said envelope having means to effect the transfer of a predetermined amount of energy therethrough only when said material is absent, comprising the combination of said envelope and means, detector means responsive to the transfer of energy through said first mentioned means when said material is absent for producing an output signal indicative of such absence, and selector means actuated in response to said output signal of said detector means for manifesting the presence or absence condition of said envelope as determined by said detector means.

25. An apparatus for detecting the presence or absence of material enclosed in an envelope, each said envelope having complementary electrically conductive discontinuous strips each on opposite interior surfaces thereof to constitute a continuous conductor when said material is absent, comprising the combination of said envelope, detector means responsive to the conductibility of electric current through said continuous conductor when said material is absent for producing a signal indicative of such absence, said detector means including a pair of electrically conductive sensing electrodes for contacting opposite extremities of said continuous conductor when disposed intermediate said electrodes, and selector means actuated in response to said signal of said detector means to manifest the presence or absence condition of said envelope as determined by said detector means.

References Cited in the file of this patent

UNITED STATES PATENTS

| Number | Name | Date |
|---|---|---|
| 310,495 | Crane | Jan. 6, 1885 |
| 902,648 | Drinkwater | Nov. 3, 1908 |
| 990,057 | Raymer | July 25, 1911 |
| 1,371,670 | Dority et al. | Mar. 15, 1921 |
| 1,667,837 | Bryce | May 1, 1928 |
| 1,997,157 | Tauschek | Apr. 9, 1935 |
| 2,092,705 | Shank | Sept. 7, 1937 |
| 2,138,645 | Rey | Nov. 29, 1938 |
| 2,224,646 | Freedman et al. | Dec. 10, 1940 |
| 2,294,751 | Harrison et al. | Sept. 1, 1942 |
| 2,502,785 | Gottschalk | Apr. 4, 1950 |
| 2,570,288 | Todd | Oct. 9, 1951 |
| 2,656,923 | Cox | Oct. 27, 1953 |
| 2,668,618 | Seelhoff | Feb. 9, 1954 |
| 2,697,514 | Stahl | Dec. 21, 1954 |
| 2,719,629 | Robinson | Oct. 4, 1955 |
| 2,742,222 | Braccio | Apr. 17, 1956 |
| 2,775,405 | Paston | Dec. 25, 1956 |
| 2,806,614 | Butz | Sept. 17, 1957 |
| 2,862,617 | Brown | Dec. 2, 1958 |